United States Patent
König et al.

(10) Patent No.: US 10,309,795 B2
(45) Date of Patent: Jun. 4, 2019

(54) METHODS AND SYSTEMS FOR GENERATING ROUTING POLICIES AND ROUTES

(71) Applicant: TomTom Navigation B.V., Amsterdam (NL)

(72) Inventors: Felix Godafoss König, Berlin (DE); Heiko Schilling, Nottingham (GB)

(73) Assignee: TOMTOM NAVIGATION B.V., Amsterdam (NL)

( * ) Notice: Subject to any disclaimer, the term of this patent is extended or adjusted under 35 U.S.C. 154(b) by 0 days.

(21) Appl. No.: 15/549,205

(22) PCT Filed: Feb. 26, 2016

(86) PCT No.: PCT/EP2016/054126
§ 371 (c)(1),
(2) Date: Aug. 7, 2017

(87) PCT Pub. No.: WO2016/135310
PCT Pub. Date: Sep. 1, 2016

(65) Prior Publication Data
US 2018/0023971 A1    Jan. 25, 2018

(30) Foreign Application Priority Data
Feb. 26, 2015    (GB) .................................. 1503227.9

(51) Int. Cl.
*G01C 21/34* (2006.01)
*G08G 1/0968* (2006.01)
*G01C 21/36* (2006.01)

(52) U.S. Cl.
CPC ..... *G01C 21/3617* (2013.01); *G01C 21/3415* (2013.01); *G01C 21/3484* (2013.01);
(Continued)

(58) Field of Classification Search
CPC ............ G01C 21/3614; G01C 21/3676; G01C 21/3415; G01C 21/3484; G08G 1/096838; G08G 1/096844
(Continued)

(56) References Cited

U.S. PATENT DOCUMENTS

2003/0069683 A1* 4/2003 Lapidot .................. G01C 21/34
701/117
2004/0220728 A1* 11/2004 Cayford ................. G01C 21/30
701/468
(Continued)

FOREIGN PATENT DOCUMENTS

| WO | 2009053411 A1 | 4/2009 |
| WO | 2014001549 A1 | 1/2014 |

OTHER PUBLICATIONS

International Search Report dated May 24, 2016 for application No. PCT/EP2016/054126.
(Continued)

*Primary Examiner* — Tan Q Nguyen

(57) ABSTRACT

A method of generating a routing policy from an origin to a destination through a navigable network, the navigable network being represented by an electronic map comprising a plurality of segments representing navigable segments of the navigable network, each segment having associated therewith data indicative of an expected travel time along the segment. The expected travel times are used for respective segments of the electronic map to determine a route from the origin to the destination that has a shortest expected journey time using a deterministic routing algorithm. A stochastic routing algorithm is then used to generate a routing policy that maximizes the probability of arriving at the destination within a time budget from leaving the origin, wherein the time budget is based at least on said determined shortest expected journey time. A route from the origin to the
(Continued)

Use expected travel times for segments of the electronic map to determine a route from the origin to the destination that has a shortest expected journey time — 501

Use a stochastic routing algorithm to generate a routing policy that maximises the probability of arriving at the destination within a time budget from leaving the origin, wherein the time budget is equal to said shortest expected journey time multiplied by a scaling factor — 502 destination can then be generated by applying the routing policy to a scenario in which each segment is transited in a time based on the data indicative of the expected travel time associated with the respective segment.

20 Claims, 4 Drawing Sheets

(52) U.S. Cl.
CPC ..... *G01C 21/3492* (2013.01); *G01C 21/3676* (2013.01); *G08G 1/096838* (2013.01); *G08G 1/096844* (2013.01)

(58) Field of Classification Search
USPC .......................................................... 701/533
See application file for complete search history.

(56) References Cited

U.S. PATENT DOCUMENTS

| | | | | |
|---|---|---|---|---|
| 2005/0093720 | A1* | 5/2005 | Yamane | G01C 21/3492 340/995.13 |
| 2011/0112753 | A1* | 5/2011 | Yamane | G01C 21/3492 701/532 |
| 2012/0283948 | A1* | 11/2012 | Demiryurek | G01C 21/3446 701/533 |

OTHER PUBLICATIONS

Search Report dated Aug. 19, 2015 for GB Application No. 1503227.9.

Fan. Y. and Nie. Y., "Optimal routing for Maximizing the Travel Time Reliability", Networks and Spatial Economics, vol. 6:3-4, p. 333-344, Springer 2006.

* cited by examiner

US 10,309,795 B2

METHODS AND SYSTEMS FOR GENERATING ROUTING POLICIES AND ROUTES

CROSS-REFERENCE TO RELATED APPLICATIONS

The present application is a National Stage of International Application No. PCT/EP2016/054126, filed on Feb. 26, 2016, and designating the United States, which claims benefit to United Kingdom Patent Application 1503227.9 filed on Feb. 26, 2015. The entire content of these applications is incorporated herein by reference.

FIELD OF THE INVENTION

This invention relates to methods and systems for generating routing policies and routes, and extends to navigation devices and servers arranged to generate routes.

BACKGROUND TO THE INVENTION

Navigation devices that include GPS (Global Positioning System) signal reception and processing functionality are well known, and are widely employed in vehicle navigation systems. Typically, a navigation device uses an algorithm to compute an "optimal" route, such as the faster, shortest, most fuel efficient, etc, between an origin and a destination on a navigable network represented by a digital map.

The digital map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. The nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the legal speed limit, etc.

The algorithm used to determine the optimum route may take into account historic, existing or predicted information relating to roads or traffic. An optimum route to a destination is commonly calculated using a deterministic routing algorithm, in which each segment is assigned a cost (which may be fixed or time-dependent) and in which various possible routes between an origin and the destination are explored, to determine a route that has a lowest total cost along all of its segments.

In order to generate accurate, time-dependent routes, some routing algorithms use data indicating an expected speed of travel along the segment at a plurality of different time periods; such data typically being associated with relevant segments of the digital map. This data, which is typically derived from position data collected from a plurality vehicles that have travelled the segment in the past, i.e. historic data, and can thus be thought of as time-dependent average speed, can thus be used to determine a speed at any time of the day that a vehicle is expected to travel along the segment. An average speed associated with an element can be determined according to the method described in WO 2009/053411 A1; the entire contents of which is incorporated by reference.

Routing algorithms may also make use of real-time traffic information, such as live positional data, to adjust the historic expected speed or time of travel for a segment to reflect a current speed or time or travel, and thus taking account of current events effecting movements along portions of the navigable network, e.g. traffic, weather, etc. Live data may be thought of as data which is relatively current and provides an indication of relatively current conditions on each navigable element. The live data may typically relate to the conditions on the elements within the last 30 minutes, 15 minutes, 10 minutes or 5 minutes.

However, routes generated by such deterministic routing algorithms are not always ideal where a user wishes to arrive at a destination by a particular time (e.g. in order to catch a specific train, or to attend a scheduled business meeting). A user may, for example, be led to expect to arrive at his destination by a particular time when following a fastest route, as computed at the start of his journey. However, such a route may be prone to unpredictable delays, such as queues due to congestion, accidents, road works, etc, which could cause the user to arrive later than the expected time. A route that is typically slower, but more consistent in the time taken to travel it, may have a greater likelihood of getting the user to his destination by the required time. Even if a user does not have to arrive at his destination by a particular time, he may still prefer a route that is, on average, a little slower over a route that is, on average, faster, if the slower route has less variation in the total journey time. There is thus a desire for navigation devices that can generate such routes.

Non-deterministic (stochastic) routing algorithms have been developed that can generate routing policies that maximise the probability of arriving at a destination within a predefined time budget. For example, the journal article "Optimal Routing for Maximizing the Travel Time Reliability" by Y. Fan and Y. Nie, Networks and Spatial Economics, volume 6:3-4, pp. 333-344, Springer 2006, the content of which is hereby incorporated by reference, describes a "Stochastic On-Time Arrival" (SOTA) algorithm that can generate such a routing policy. Rather than using single cost values for respective road segments, such an algorithm makes use of probability density or mass functions for respective road segments. These functions assign probabilities to a set of possible travel times for the segment.

The routing policy generated by such an algorithm is not a single route, but is instead defined by a set of nonlinear equations. The path of a journey based on such a routing policy will vary based on the actual time taken by the traveller to reach each particular node (which determines how much time remains from the predefined time budget to reach the destination). The equations therefore provide a dynamic routing strategy for travelling from the origin to the destination, which takes account of the actual time taken to travel between nodes to adapt the route as the journey progresses. When using a routing policy to navigate to a destination, a decision as to which path to take at an intersection is not determined in advance (as with deterministic algorithms), but is made as the user arrives at the intersection, based on his remaining time budget, so as to maximize the probability of arriving at the destination within the time budget. Accordingly, if a user has traversed a first leg of a journey faster than expected, then he may be instructed to take a possibly slower, but more reliable route, for the second leg. Conversely, if a user has traversed the first leg slower than anticipated, then he may be instructed to take a quicker, but more risky route, for the second leg.

For the sake of completeness, the SOTA model can be summarised in the following manner. Let us consider a directed network $G(N,A)$ with $|N|=n$ nodes and $|A|=m$ links. The weight of each link $(i,j) \in A$ is a random variable with probability density function $p_{ij}(\cdot)$ that represents the travel time on link $(i,j)$. Given a time budget T, an optimal routing strategy is defined to be a policy that maximizes the probability of arriving at a destination node s within time T. A routing policy is an adaptive solution that determines the optimal path at each node in the network based on the travel time realized to that point. This is in contrast to a-priori solutions that determine the entire path prior to departure. Given a node $i \in N$ and a time budget t, $u_i(t)$ denotes the probability of reaching node s from node i in less than time t when following the optimal policy. At each node i, the traveller should pick the link $(i,j)$ that maximizes the probability of arriving on time at the destination. If j is the next node being visited after node i and $\omega$ is the time spent on link $(i,j)$, the traveller starting at node i with a time budget t has a time budget of t-$\omega$ to travel from j to the destination, as described in the following equation:

$$u_i(t) = \max_j \int_0^t p_{ij}(\omega) u_j(t - \omega) d\omega \text{ where}$$

$$\forall i \in N, i \neq s, (i, j) \in A, 0 \leq t \leq T$$

$$u_s(t) = 1 \text{ where } 0 \leq t \leq T$$

and $p_{ij}(\cdot)$ is the travel time distribution on link $(i,j)$. The functions $p_{ij}(\cdot)$ are obtained, for example, using historic and/or live positional data, e.g. as described above with reference to determining average travel times. The functions $p_{ij}(\cdot)$ can be time-dependent, and can even include spatial and/or temporal correlations between links, e.g. as described in the journal article "A tractable class of algorithms for reliable routing in stochastic networks" by Samaranayake et al., Transportation Research Part C: Emerging Technologies, volume 20:1, pp. 199-217, Pergamon 2012; the content of which is hereby incorporated by reference.

While the generation of such routing policies has been studied at a theoretical level, it is not obvious how this theory can be exploited effectively in user-friendly navigation devices.

SUMMARY OF THE INVENTION

In accordance with a first aspect of the invention there is provided a method of generating a routing policy from an origin to a destination through a navigable network, the navigable network being represented by an electronic map comprising a plurality of segments representing navigable segments of the navigable network, each segment having associated therewith data indicative of an expected travel time along the segment, the method comprising:

using the expected travel times for respective segments of the electronic map to determine a route from the origin to the destination that has a shortest expected journey time using a deterministic routing algorithm; and using a stochastic routing algorithm to generate a routing policy that maximises the probability of arriving at the destination within a time budget from leaving the origin, wherein the time budget is based at least on said determined shortest expected journey time.

The steps of the method of the present invention in any of its aspects or embodiments may be carried out in part by a server and in part by a navigation apparatus or device. The steps of the method may be performed exclusively on a server, or some on a server and the others on a navigation apparatus or device in any combination, or exclusively on a navigation apparatus or device. Thus, the system of the present invention in its further aspects discussed below may be provided in part by a navigation device or other mobile device, and in part by a server.

The present invention extends to a system for carrying out a method in accordance with any of the aspects or embodiments of the invention herein described.

In accordance with another aspect of the invention there is provided a system for generating a routing policy from an origin to a destination through a navigable network, the navigable network being represented by an electronic map comprising a plurality of segments representing navigable segments of the navigable network, each segment having associated therewith data indicative of an expected travel time along the segment, the system comprising:

means arranged to use the expected travel times for respective segments of the electronic map to determine a route from the origin to the destination that has a shortest expected journey time using a deterministic routing algorithm; and means arranged to use a stochastic routing algorithm to generate a routing policy that maximises the probability of arriving at the destination within a time budget from leaving the origin, wherein the time budget is based at least on said determined shortest expected journey time.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

Thus it will be seen by those skilled in the art that, in accordance with these aspects of the invention, a time budget for a routing policy is set based on a shortest expected journey time. The routing policy, as discussed above, is a solution to a set of non-linear equations that determines the next segment to take at a node of the electronic map based on the travel time taken to reach the node from the origin, such that the probability of arriving at the destination within the time budget is maximised. In embodiments, the time budget can be equal to said shortest expected journey time multiplied by a scaling factor. As will be appreciated, the dependence between the time budget and the shortest expected journey time can be of any other form as desired. The scaling factor can be used to adjust the time budget as required, while still maintaining a dependence on the shortest expected journey time. The scaling factor will typically be greater than one, such that the time budget is always greater than the shortest expected journey time. Although, in other embodiments, the scaling factor may be equal to one, in which case the time budget is simply equal to the shortest expected journey time. When the scaling factor is small (e.g. close to one), the routing policy will direct the user along a route that is likely to be fast, but which may have a highly variable duration. This is because a tight time budget can only be kept when sticking to routes which are expected to be fast on average. When the scaling factor is greater, the user is likely to be directed along a route that is expected to be slower, but that has a more certain arrival time.

Defining a time budget in this manner avoids having to ask the user to decide on a time budget. This is desirable for at least two reasons: first, it allows a route to be determined without obliging the user to enter any information beyond the destination (although this possibility is not excluded); and, secondly, it avoids an inappropriate time budget being selected, which might be too short to be achievable, or which might be unnecessarily long (and therefore wasteful of the user's time and/or fuel).

The scaling factor may be set by a user. In some embodiments, a numerical input may be received from the user, which may determine the value of the scaling factor. However, in preferred embodiments, a qualitative input is received from the user, from which the scaling factor is derived. For example, a user may interact with a one-dimensional input mechanism, such a graphical slider on a touchscreen interface, which may determine the value of the scaling factor according to a predetermined function of the input position. A first end of the one-dimensional input may correspond with a scaling factor equal to, or near, one. A second end of the one-dimensional input may correspond with a predetermined maximum value for the scaling factor (which may be determined experimentally). Positions between two ends of the one-dimensional input may determine the scaling factor according to a linear scale between the values at the ends, or according to any other suitable function.

The scaling factor may instead be predetermined (i.e., not set directly by a user). An appropriate scaling factor may be determined experimentally. It may, for instance, be determined by conducting routing simulations, using different values for the scaling factor, and determining what value yields routing policies that deviate from a fastest route significantly (e.g., on at least 50% of the route), but which do not result in an unacceptable increase in expected travel time (e.g. more than 10%).

The desired time budget, and preferably the scaling factor, may vary depending on an environmental factor, such as time or weather, or on a property of the route or the navigable network, e.g., according to one or more predetermined relationships or functions. For instance, the desired time budget, and preferably the scaling factor, may depend on one or more factors selected from the set consisting of: a user input (e.g. as discussed above); the time of the day; the time of the week; a type classification (e.g. "urban" or "rural") for a region containing the origin and/or the destination and/or part or all of the navigable network between the origin and the destination; and the distance between the origin and the destination.

In some embodiments, the scaling factor may be a function of two inputs: (i) a quantitative or qualitative user input, and (ii) a value not set directly by the user (e.g., as described in the preceding paragraph). The scaling factor may, for instance, equal the product of a value determined by the user and a value based on a factor such as time or a property of the intended journey.

In some instances, the scaling factor might be less than one, but preferably the scaling factor is greater than or equal to one, since this gives a greater chance of the traveller arriving within the time budget.

It will be appreciated that the invention extends to embodiments in which the time budget is substantially equal to the shortest expected journey time, multiplied by a scaling factor (e.g. within +/−5% or 10% of it).

The stochastic routing algorithm may be a SOTA algorithm as described above, or it may be any other algorithm that can generate a routing policy that maximises the probability of arriving at a destination within a time budget from leaving an origin. The algorithm preferably uses probability distributions of travel times along respective segments. These probability distributions may be dependent on time, e.g. on time of the day, time of the week, etc. The probability distributions can also be made more complex through the use of spatial and/or temporal correlations between segments, e.g. (i) the probability distribution can be different depending on the previous segment used to enter onto the segment in question, e.g. to take account of waiting time at traffic lights, performance of complex manoeuvres, etc and (ii) the probability distribution can be different depending on traffic conditions at certain times on certain segments, e.g. when traffic is usually slow on road A at time x, there is an increased probability that traffic will be slow on road B at time x+y.

The expected travel times for segments of the electronic map may be derived from historic data. In some embodiments, they may be generated and/or stored separately from the probability-distribution data used to generate the routing policy (e.g. probability density or mass functions for respective segments). They may, for example, be based on a limited set of normalised segment speed profiles (e.g. sixteen normalised profiles, where every road segment in the electronic map is assigned one of the profiles). The granularity of any time dependency in the expected travel times (e.g. values for each 5 minute interval across the week) may differ from that of the probability distributions. However, in some embodiments, the expected travel times may be mathematically related to, or derived from, the probability-distribution data used to generate the routing policy. In one set of embodiments, each segment has an associated probability density function, $f(x)$, and the expected travel time for the segment equals the integral of $x.f(x)$ over all $x$. In another set of embodiments, each segment has an associated probability mass function, $f(x)$, and the expected travel time for the segment equals the sum of $x.f(x)$ over all $x$. The method may comprise a step of calculating expected travel times for at least some segments of the electronic map from probability-distribution data.

The route that has a shortest expected journey time (i.e. a fastest route) may be determined using any appropriate deterministic algorithm, such as one based on Dijkstra's algorithm.

The generated routing policy is preferably used to generate directions for guiding a user from the origin to the destination, based on data relating to movement of the user through the navigable network (e.g. time-stamped position data as determined from a positioning device associated with the user, such as a navigation satellite system, e.g. GPS).

Such an approach has a shortcoming in that users are used to receiving details of a recommended route to the destination before they leave the origin; however, no such route exists when using a routing policy, since the route that is followed is fixed only as the journey progresses, based on actual travel times, which are not known in advance. It may be unnerving for a user to embark on a journey without any indication from the navigation device that a route has been calculated.

Thus, in accordance with a further aspect of the invention, there is provided a method of generating a route between an origin and a destination through a navigable network, the navigable network being represented by an electronic map comprising a plurality of segments representing navigable segments of the navigable network, each segment being connected to another segment by a node, and each segment having associated therewith data indicative of an expected travel time along the segment, the method comprising:

accessing a routing policy that maximises the probability of arriving at the destination within a predetermined time budget; and generating a route from the origin to the destination by applying the routing policy to a scenario in which each segment is transited in a time based on the data indicative of the expected travel time for the respective segment, such that the arrival time at a node is the sum of the expected travel times of the segments forming the route from the origin to the node.

The present invention extends to a system for carrying out a method in accordance with any of the aspects or embodiments of the invention herein described.

Therefore, in accordance with another aspect of the invention, there is provided a system for generating a route between an origin and a destination through a navigable network, the navigable network being represented by an electronic map comprising a plurality of segments representing navigable segments of the navigable network, each segment being connected to another segment by a node, and each segment having associated therewith data indicative of an expected travel time along the segment, the system comprising:

means arranged to access a routing policy that maximises the probability of arriving at the destination within a predetermined time budget; and means arranged to generate a route from the origin to the destination by applying the routing policy to a scenario in which each segment is transited in a time based on the data indicative of the expected travel time associated with the respective segment, such that the arrival time at a node is the sum of the times to travel the segments forming the route from the origin to the node.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

Thus it will be seen by those skilled in the art that, in accordance with these aspects of the invention, a route can be extracted from a routing policy, e.g. for display to the user, before they depart from an origin. This is achieved by applying the routing policy to a situation in which each segment is traversed in a time based on the expected travel time associated with the respective segment. For example, in an embodiment, the route policy is applied to the situation in which each segment is traversed in the expected travel time associated with the respective segment. While the extracted route is not necessarily the route that will actually be followed in any particular instance, it provides a good indication of one of the most likely routes, and can therefore be displayed to a user as a recommended or indicative route.

Information relating to the route (e.g. a path on a map, or a set of directions) is preferably displayed for a user. The user is preferably guided to the destination according to the routing policy (and not simply according to the generated route).

The expected travel times for the segments may be derived from historic data and/or live data, e.g. as described above. In some embodiments, they may be generated and/or stored separately from probability-distribution data on which the routing policy is based. They may, for example, be based on a limited set of normalised segment speed profiles (e.g. sixteen normalised profiles, where every road segment in the electronic map is assigned one of the profiles). They may be time-dependent, in which case the scenario may be applied for a particular departure time, and the expected travel times may be selected so as to correspond with the expected time at which the various respective segments are transited under the scenario. The granularity of any time dependency in the expected travel times (e.g. values for each 5 minute interval across the week) may differ from that of the routing-policy probability distributions. However, in some embodiments, the expected travel times may be mathematically related to, or derived from, the probability-distribution data used to generate the routing policy, e.g. in one of the manners described above.

The expected travel times may be the average travel time or the mode travel time of users, e.g. vehicles, traversing the segment of the navigable network.

The data indicative of the expected travel time along the segment may comprise an expected travel time, or it may comprise an expected speed that can be converted to an expected travel time for the segment based on the length of the segment. The data associated with each segment may be stored in the electronic map, or the data may be stored separately from the electronic map, e.g. in a side file that can be dynamically updated with data based on live conditions on the navigable network.

The routing policy may be generated outside the system, but preferably it is generated by the system. Accessing the routing policy may comprise accessing data representing or relating to the routing policy from a memory. It may, in some embodiments, be generated as described above with reference to the preceding aspects of the invention. More generally, any feature of any of the preceding aspects or embodiments may be a feature of embodiments of the present aspects also.

In some embodiments, a plurality of routing policies may be accessed or generated, each of which maximises the probability of arriving at the destination within a different respective time budget. A respective plurality of routes may be generated from the routing policies by applying each routing policy to a scenario in which each segment is transited in a time based on the data indicative of the expected travel time associated with the respective segment. These extracted routes may be presented to a user as a set of alternative routes from the origin to the destination. The inventors have realised that, when drivers desire an alternative to a particular route, they may often be seeking (consciously or unconsciously) a more reliable route. By presenting two or more routes to the user based on different time budgets, the user is able to select a route that gives a desired balance between speed and reliability. In such embodiments, the user may then be guided to follow the routing policy from which the selected route was generated.

The different respective time budgets may be set by applying different respective scaling factors to a common shortest travel time, as described above. These different scaling factors may be a predetermined set of scaling factors (e.g. a fixed set of five or six scaling factors), or their values may depend on one or more factors selected from the set consisting of: the time of the day; the time of the week; a type classification (e.g. "urban" or "rural") for a region containing the origin and/or the destination and/or part or all of the navigable network between the origin and the destination; and the distance between the origin and the destination.

Preferably, a routing policy is generated first for the largest of a set of different time budgets. This is advantageous because, for many SOTA algorithms, a routing policy for a given origin and destination, with a given time budget, inherently includes all routing policies for the same origin and destination but with a smaller time budget. Hence, even when several alternatives, with different time budgets, are desired, it can be possible to run only a single SOTA computation, thereby reducing the amount of computation required.

In some embodiments, a single routing policy may be accessed or generated, and a plurality of routes generated from the origin to the destination by application the routing policy to a plurality of scenarios based on the data indicative of the expected travel time associated with the segments. Thus, in some embodiments, just a single route is generated by applying the routing policy to a scenario in which each segment along all of the route is transited in an expected travel time for the respective segment. However, in other embodiments, two or more routes may be generated from a single routing policy by applying the routing policy to different scenarios. For example, a first route may be extracted from the routing policy using the scenario in which segment is transited in the expected travel time for the segment. Next, a second route may then be extracted using a scenario in which none or only some, but not all, of the segments along the route are transited in the expected travel times for the respective segments. The other segments along the route may be transited in times other than the expected travel times. For example, adjusted expected travel times may be used on segments forming a predetermined portion of the first extracted route from the origin (e.g. for the first 20% of the first extracted route). The adjusted expected travel times may comprise a different percentile of travel time of users, e.g. vehicles, traversing the segment of the navigable network. For example, the $30^{th}$ percentile may be used such that the expected travel time for segments is increased relative to the average. Alternatively, the $70^{th}$ percentile may be used such that the expected travel time for segments is decreased relative to the average. As will be appreciated, any other percentile values may be used as desired. In other embodiments, rasher than using different percentile values, the fastest n % and/or the slowest m % of the distribution may be disregarded (for any suitable values of n and m), and the average, mode or other percentile value recalculated to determine an adjusted expected travel time. In one example, n and m may be 5%, although it will be appreciated that any values can be used as desired. When more alternatives are desired, the process may be repeated on the resulting alternatives, now assuming different expected travel times for at least some, possibly all, of the segments of the second extracted route. As before, such a plurality of routes may be presented to a user as a set of alternative routes from the origin to the destination.

In some embodiments, these two different approaches to generating a set of alternative routes (based on multiple routing policies, and based on extracting multiple routes from a single routing policy) may be combined, so as to generate a set of alternative routes from a plurality of routing policies, at least one of which (and potentially all of which) is used to generate a plurality of routes.

In general, references herein to a probability distribution may comprise a probability density function, or a probability mass function, or any other suitable distribution. Such a probability distribution may be generated from measured data (e.g., from tracking the movement of vehicles around a road network). It may be an approximation or estimate. It may be expressed in terms of speed, or travel time, or any other suitable value. It may be time-dependent, such that a probability distribution is determined for each of a plurality of predetermined time periods (e.g., for each 5-minute interval of the day, or of the week). The probability distributions may also represent spatial and/temporal correlations between segments. For example, a probability distribution for a segment may differ depending on what preceding segment was used to enter onto the segment in question. In this way, it may take account of waiting time at traffic lights, or performance of complex manoeuvres, etc. As another example, a probability distribution for a segment may differ depending on conditions at one or more times on one or more other segments; e.g. to capture effects such as, when traffic is usually slow on road A at time x, there is an increased probability that traffic will be slow on road B at time x+y.

A probability distribution and/or a routing policy and/or expected travel-time information may be stored in any suitable format, and may be distributed across one or more storage media. It may be stored in a simplified, or compressed, or mathematically equivalent format.

In general, the system of the present invention in any of its embodiments may be or comprise at least one processing device. Such a processing device may be a component of a mobile device, such as a navigation device, whether a portable navigation device (PND) or an integrated device, or may be a component of a server.

Methods of the present invention are preferably implemented in the context of a navigation operation. Thus, the methods are preferably carried out by a set of one or more processors of a device or system having navigation functionality. However, it will be appreciated that the methods may also be carried out by any suitable system having route-generating capability, but not necessarily navigation functionality. For example, the methods may be implemented by a computer system, e.g. a desktop or laptop system, which does not have navigation functionality (e.g., which cannot determine its own location).

In preferred embodiments, methods of the present invention in any of its aspects or embodiments are carried out using a navigation device, and the present invention extends to a navigation device arranged to carry out the steps of the method of any of the aspects or embodiments of the invention. The navigation device may be a PND or an integrated, e.g. in-vehicle, device.

In accordance with any of the aspects or embodiments of the invention the navigation device may comprise a display for displaying an electronic map to a user. It may comprise a set of one or more processors configured to access electronic map data and cause an electronic map to be displayed to a user via the display. It may comprise a user interface operable by a user to enable the user to interact with the device. Thus, the system of the present invention may be a system, e.g. processing device, of a navigation device.

In other embodiments, methods of the present invention in any of its aspects or embodiments may be carried out by a server, and the present invention extends to one or more servers arranged to carry out the steps of the method of any of the aspects or embodiments of the invention. The system of the present invention of any of its aspects or embodiments may be a system, e.g. processing device, of a server.

Of course, the steps of the methods of the present invention in any of its aspects or embodiments may be carried out in part by a server and in part by a navigation apparatus. For example, route generation or routing-policy generation may be carried out by a server, e.g. at the request of a navigation device, and an output of the generation may be provided to the device, which may use it to provide a route to a user, or to guide a user. The steps of the methods may be performed exclusively on a server, or some on a server and the others on a navigation device in any combination, or exclusively on a navigation device. Performance of one or more of the steps on the server may be efficient and may reduce the computational burden placed on a navigation device. Alternatively, if one or more steps are performed on the navigation device, this may reduce any bandwidth required for network communication. Thus, the systems of the present invention may be provided in part by a navigation device or other mobile device, and in part by a server.

The origin and the destination may be obtained in any suitable manner. For example, the origin and/or destination may be user specified. Alternatively, the origin may be the current location of the user. In other arrangements, the origin and/or destination may be inferred from a path of the user, or a previously travelled route, etc.

Preferably methods of the invention extend to a step of storing data representing, or indicative of, a generated routing policy or a generated route.

Data may be output that is indicative of one or more generated routes. For example, the one or more generated routes may be displayed to the user. In embodiments, and when a plurality of routes, i.e. alternate routes, are generated (either from a single routing policy or from a plurality of routing policies), the plurality of generated routes may be displayed simultaneously to the user. Such a step may be performed by any suitable device, which may or may not have navigation functionality. In some embodiments the device is a navigation device, such as a PND or integrated navigation device. The navigation device may be associated with a vehicle.

Methods of the invention may comprise a step of generating a set of navigation instructions, and optionally outputting the instructions, based on a generated or selected routing policy. In embodiments, and when a plurality of alternate routes are generated from a plurality of routing policies, the user may make a selection of one of the routing policies, with the set of navigation instructions being generated and optionally output, using the selected routing policy. The selection of the routing policy may be made based on the plurality of alternate routes that are displayed.

It should be noted that the phrases "associated with" and "for", in relation to one or more segments, should not be interpreted to require any particular restriction on data storage locations. The phrase only requires that the features are identifiably related to a segment. Therefore association may, for example, be achieved by means of a reference to a side file, potentially located in a remote server.

The term "segment" as used herein takes its usual meaning in the art. A segment may be a navigable link that connects two nodes, or any portion thereof. While some embodiments of the present invention are described with reference to road segments, it should be realised that the invention may also be applicable to other navigable segments, such as segments of a path, river, canal, cycle path, tow path, railway line, or the like. For ease of reference, these are commonly referred to as a road segment, but any reference to a "road segment" may be replaced by a reference to a "navigable segment" or any specific type or types of such segments.

Any of the methods in accordance with the present invention may be implemented at least partially using software, e.g. computer programs. The present invention thus also extends to a computer program comprising computer readable instructions executable to perform, or to cause a navigation device and/or server to perform, a method according to any of the aspects or embodiments of the invention.

The invention also extends to a computer software carrier bearing such software which, when used to operate a system or apparatus comprising data processing means, causes said apparatus or system to carry out the steps of the methods of the present invention. Such a computer software carrier could be a non-transitory physical storage medium such as a ROM chip, non-volatile memory chip, CD-ROM or disk, or could be a signal such as an electronic signal over a wire, an optical signal, or a radio signal, such as to a satellite or the like. The present invention provides a machine readable medium containing instructions which, when read by a machine, cause the machine to operate according to the methods of any of the aspects or embodiments of the invention.

Regardless of its implementation, a device, e.g. navigation apparatus, used in accordance with the present invention in any of its aspects or embodiments may comprise a processor, memory, and digital map data (or electronic map) stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include global navigation satellite system (GNSS), e.g. GPS or GLONASS, signal reception and processing functionality. As will be appreciated the navigation apparatus may use other means for determining its current location as desired, e.g. terrestrial beacons, the mobile telecommunications network, etc. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the navigation apparatus may be implemented at least in part by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

Features of any aspect or embodiment described herein may, wherever appropriate, be applied to any other aspect or embodiment described herein. If not explicitly stated to the contrary, systems embodying the invention may comprise means for carrying out any step described in relation to a method of the invention in any of its aspects or embodiments, and vice versa. Where reference is made to different embodiments or sets of embodiments, it should be understood that these are not necessarily distinct but may overlap.

Advantages of these embodiments are set out hereafter, and further details and features of each of these embodiments are defined in the accompanying dependent claims and elsewhere in the following detailed description.

BRIEF DESCRIPTION OF THE FIGURES

Certain preferred embodiments of the invention will now be described, by way of example only, with reference to the accompanying drawings, in which.

DETAILED DESCRIPTION OF THE FIGURES

Embodiments of the present invention will now be described with particular reference to a Portable Navigation Device (PND). It should be remembered, however, that the teachings of the present invention are not limited to PNDs but are instead universally applicable to any type of processing device that is configured to provide route planning and navigation functionality. It follows therefore that, in the context of the present application, a navigation device may include (without limitation) any type of route planning and navigation device, irrespective of whether that device is embodied as a PND, a vehicle such as an automobile, or any portable computing resource such as a portable personal computer (PC), a mobile telephone or a Personal Digital Assistant (PDA) executing route planning and navigation software.

Furthermore, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, or that travelling to the "destination" must occur, or indeed that the presence of a destination requires the designation of a corresponding start location.

Figure 1:
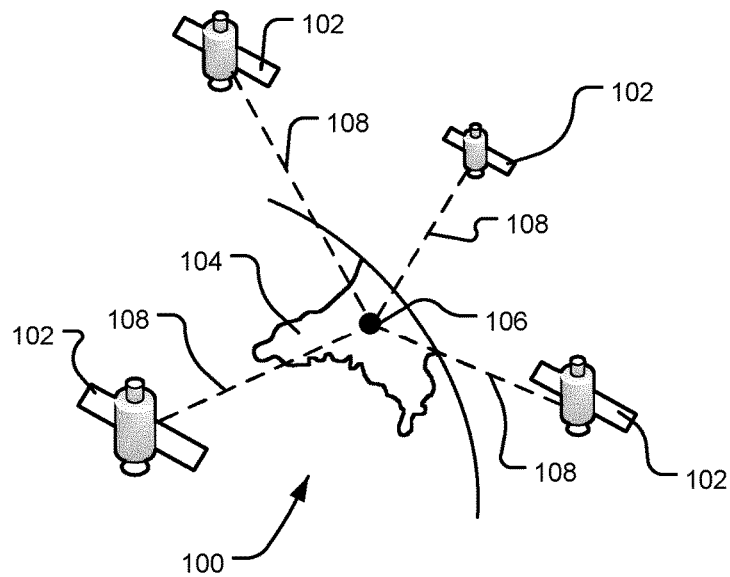
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and, in some instances, direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
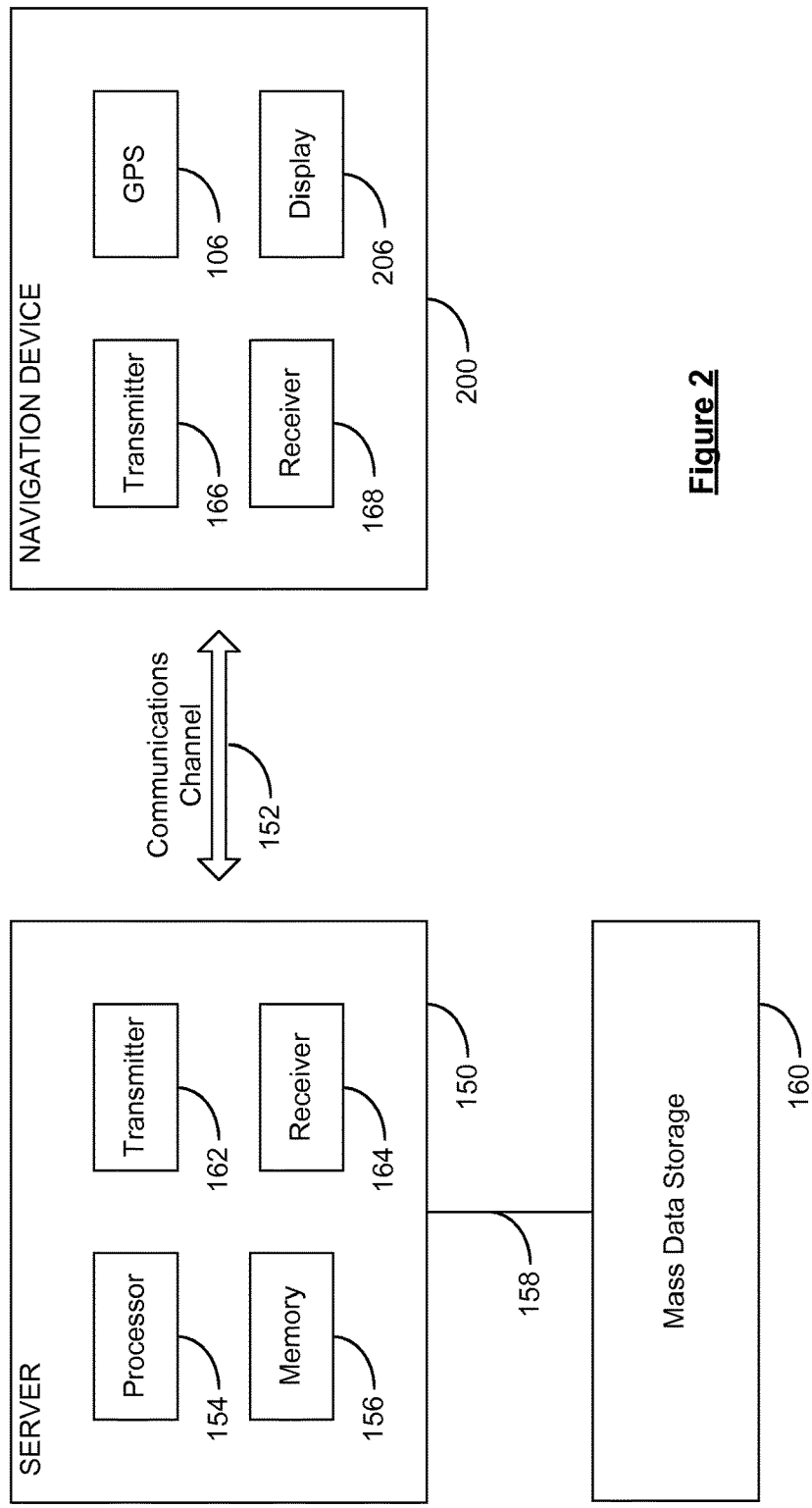
FIG. 2 is a schematic diagram of a communications system for communication between a navigation device and a server.

Turning to FIG. 2, a navigation device 200 (i.e. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above. Of course, the navigation device 200 comprises other hardware and/or functional parts, some of which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
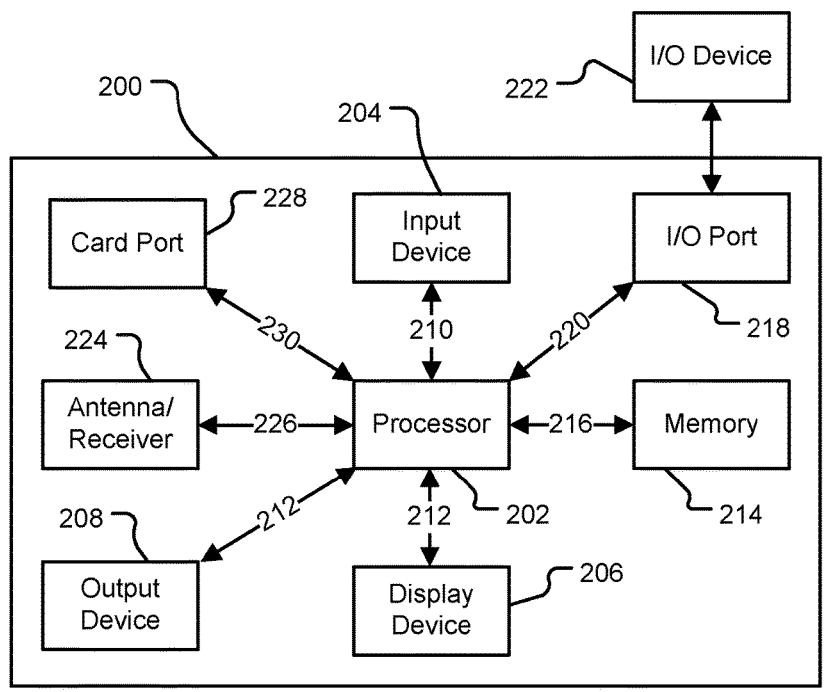
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like).

FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
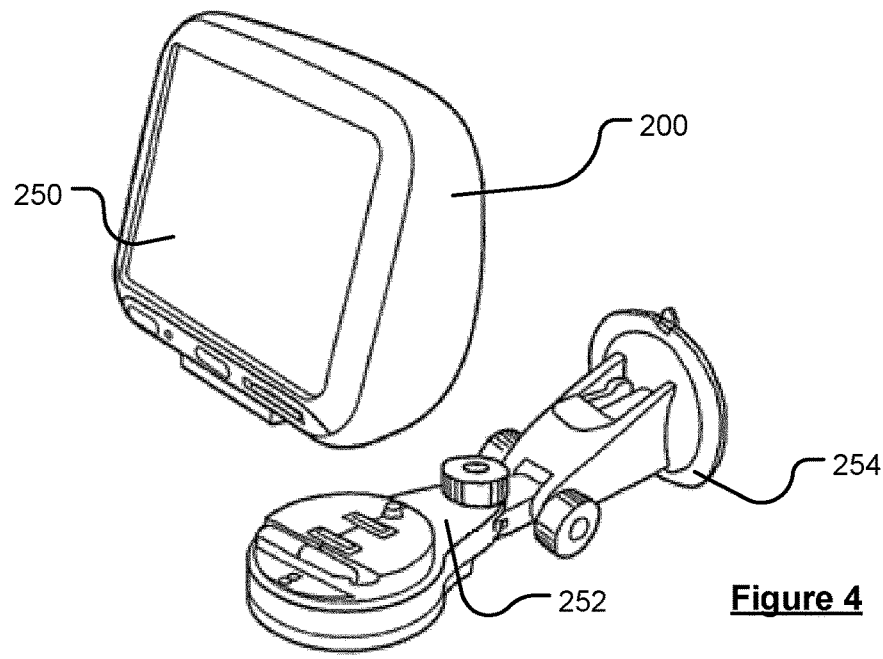
FIG. 4 is a schematic diagram of an arrangement of mounting and/or docking a navigation device.

Referring to FIG. 4, the navigation device 200 may be a unit that includes the integrated input and display device 206 and the other components of FIG. 2, including, but not limited to, the internal GPS receiver 224, the processor 202, a power supply (not shown), memory systems 214, etc.

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

In the embodiments being described, the processor 202 of the navigation device is programmed to receive GPS data received by the antenna 224 and, from time to time, to store that GPS data, together with a time stamp of when the GPS data was received, within the memory 214, to build up a record of the location of the navigation device. Each data record so-stored may be thought of as a GPS fix; i.e. it is a fix of the location of the navigation device and comprises a latitude, a longitude, a time stamp and an accuracy report.

In one set of embodiments, the data is stored substantially on a periodic basis which is, for example, every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time.

In some embodiments, it may be found that the quality of the captured data reduces as the period increases and whilst the degree of degradation will at least in part be dependent upon the speed at which the navigation device 200 was moving a period of roughly 15 seconds may provide a suitable upper limit.

Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (i.e. the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214 or card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to delete the oldest GPS fixes and as such it may be thought of as a First in First Out (FIFO) buffer.

In the embodiments being described, the record of the whereabouts comprises one or more traces with each trace representing the movement of that navigation device 200 within a 24 hour period. Each 24 is arranged to coincide with a calendar day but in other embodiments, this need not be the case.

Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts. The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data.

Uploaded traces from a number of such devices 200 may be analysed and used to generate probability distributions for different road segments. They may also be used to generate expected travel times for different road segments.

As discussed above, the mass data storage 160 also contains map data. Such map data provides information about the location of road segments, points of interest and other such information that is generally found on map.

Figure 5:
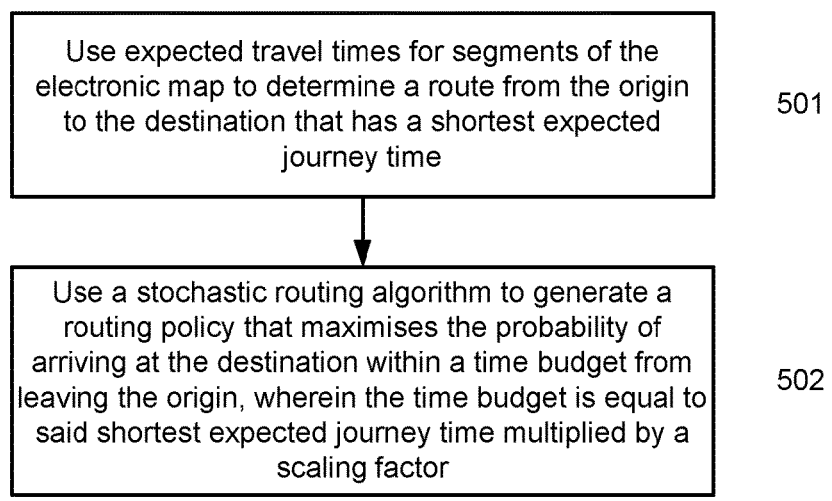
FIG. 5 is a flow chart outlining the steps of a method of generating a routing policy.

FIG. 5 illustrates an exemplary system that may be used to implement a method of generating a routing policy according to an embodiment of the invention.

At some point, the navigation device 200 may need to output navigation instructions for guiding the user through the navigable network represented by the electronic map data 160, e.g. to be displayed to a user. An origin and a destination may be specified by a user. However, the invention is equally applicable to the generation of a route between any first and second locations which may be required by the navigation device for any reason, where one or both of the first and second locations may be determined by the navigation device or a user. For example, the first location may be a current location of the device.

The electronic map data 160 preferably contains travel-time probability distribution data (discrete or continuous) associated which each segment of the road network covered by the map, either stored as part of the map data 160, or stored separately in the mass data storage 160. An expected travel time for each segment (optionally for a particular time period) may also be stored in the mass data storage 160, or the server 150 may be arranged to derive expected travel times from the probability distribution data.

The navigation device 200 communicates the origin and the destination to the server 150 over the communications channel 152. The server 150 then, in a first step 501, uses the expected travel times for segments of the map data 160 to determine a route from the origin to the destination that has a shortest expected journey time (i.e. a "fastest" route). It may use a conventional, deterministic routing algorithm to accomplish this.

Alternatively, the navigation device 200 may use locally-stored map data and expected travel-time information to determine such a fastest route. It may then optionally communicate this route, or its expected journey time, to the server 150.

The server 150 then, in a second step 502, uses a stochastic (non-deterministic) routing algorithm to generate a routing policy that maximises the probability of arriving at the destination within a time budget from leaving the origin, wherein the time budget is equal to this fastest expected journey time multiplied by a scaling factor, $\alpha$. The server 150 may then communicate the routing policy to the navigation device 200, over the communications channel 152, or it may store it in the server memory 156.

The server 150 or the navigation device 200 may then apply the generated routing policy to live GPS fix data for the navigation device, in order to generate instructions for guiding the user towards the destination. If the server 150 applies the routing policy, it will need to receive live location information from the navigation device 200, and will send instructions back to the navigation device 200 to be displayed to the user.

The value of $\alpha$ may be fixed (e.g. 1.2 or 1.6). However, it may be controlled, at least in part, by the user.

Figure 6:
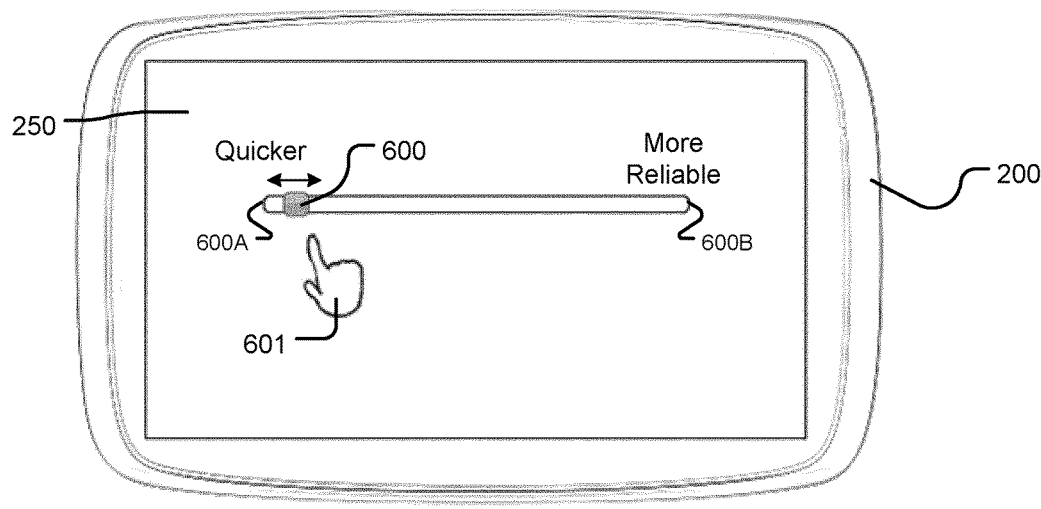
FIG. 6 is a schematic diagram of a user interacting with a display.

FIG. 6 shows a user 601 interacting with the touchscreen 250 of the navigation device 200. The touchscreen 250 is displaying a slider interface 600 whose left end 600A is marked "Quicker" and whose right end 600B is marked "More Reliable". The user 601 can use her finger to set the slider interface 600 at a desired position at one or other end 600A, 600B, or somewhere in between. The slider setting may be translated into a numerical value for a according to an appropriate mapping. The mapping may be static or may change according to the circumstances (e.g., according to a property determined by the origin and/or the destination). It may be based on measured or simulated data. The value of a may be such that $\alpha = \alpha_u \cdot \alpha_0$ where $\alpha_u$ is a user-determined value, derived from the slider setting, and $\alpha_0$ is fixed parameter.

While the steps described with reference to FIG. 5 are fully sufficient to direct a user from the origin to the destination, it may nevertheless be desirable for the user to view an indicative route before departing, e.g. to provide reassurance that the navigation device 200 has identified the correct origin and destination, or that it is functioning correctly.

Figure 7:
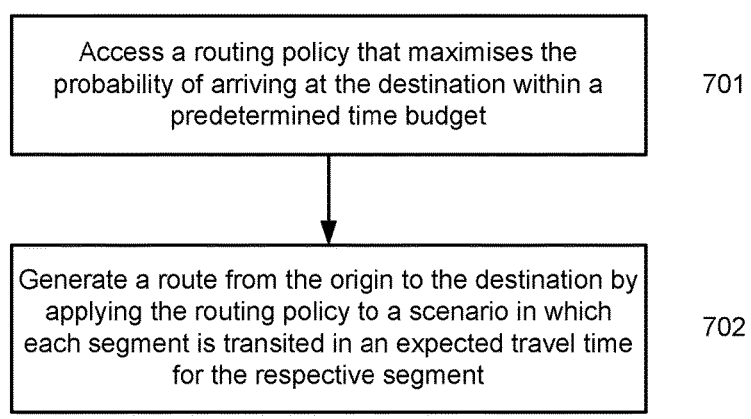
FIG. 7 is a flow chart outlining the steps of a method of generating a route from a routing policy.

FIG. 7 shows a first step, 701, in which a routing policy, such as the one described above, is received or accessed. This may occur at the navigation device 200 or at the server 150. The routing policy may be received from an external source, or it may simply be accessed by the relevant device, e.g. from an internal memory 214 or 156. In a second step, 702, a route is generated by applying the routing policy to a scenario in which each segment along some or all of the route is transited in an expected travel time for the segment.

This route may be communicated from the server 150 to the navigation device 200, if appropriate, and may be displayed to the user by the navigation device 200 for review.

Rather than displaying a single route, some embodiments may generate a set of two or more alternative routes, and display these to the user. This may be done by considering two or more scenarios, in which times other than the expected travel times are used for some of the journey in one or more of the scenarios, with the expected travel times being used only for the remainder of the journey. It may also be done by using two or more different values of a to generate two or more routing policies, each of which may be used to generate one or more routes.

In summary, it has been identified that a main obstacle in designing attractive end-user features based on SOTA is the need to explicitly specify a time-budget for each trip. Another challenge is the fact that users would typically want to see their entire recommended route before they depart, but a routing policy (in contrast to a simple route) does not define one single route. Embodiments of the invention relate to how to extract one route from a routing policy, and how to enable the automatic determination of adequate time-budgets for different situations.

Determining a Route from a Routing Policy

A sensible first route can be extracted for display for the user from a routing policy as follows. We define the route to be displayed to the user before departure as the route that would result from applying the routing policy to the situation where the user needs precisely the expected travel time on all road segments.

Basic Reliable Routing

For computing just one basic reliable route for given origin and destination, we use a time budget b based on the expected travel time t on a fastest route. Choosing a fixed parameter $\alpha_0 \geq 1$, we define:

$$b := \alpha_0 \cdot t$$

Small values of $\alpha$ yield routing policies that stay very close to fastest routes, as a tight time budget can only be kept when sticking to routes which are expected to be fast on average. Large values of $\alpha$ result in routes that are very reliable, but might incur a significant increase in expected travel time.

Reliable Routing based on User Preference

To empower users to configure route reliability to their preference, we replace the fixed parameter $\alpha_0$ with a user-defined parameter $\alpha_u$. In this situation, the time-budget for SOTA would be set to:

$$b := \alpha_u \cdot t$$

Through a combination of this concept and the basic reliable routing concept discussed above, user preference based route reliability could also benefit from adjustments that are made based on time, map region, and/or distances between origin and destination:

$$b := \alpha_0 \alpha_u \cdot t$$

For a user interface, it has been identified that it may not be sensible to confront the user with having to enter numbers, but instead to use a slider to adjust route reliability.

Alternatives Routes with Varying Reliability

When route reliability can be adjusted via a parameter $\alpha$, we can also use SOTA to compute route alternatives of varying reliability. In fact, it is believed in many situation where drivers desire route alternatives, they are indeed (but possibly unconsciously) looking for more reliable alternatives.

Along these lines, a network of route alternatives can be computed by extracting routes as described above from several routing policies that were computed for different time-budgets (i.e. different values of parameter $\alpha$). These different values for parameter $\alpha$ could either come from a fixed set of values, or the set of parameters used for alternatives calculation could depend on time, map region, trip distance, etc.

Alternatives Routes Anticipating Different Traffic Situations

Another way to employ SOTA to compute route alternatives is to utilize a computed routing policy directly. As described above, a routing policy is essentially a set of rules how to continue towards the destination, depending on the travel time incurred on the route so far. Consequently, one routing policy may result in many different routes when incurring different travel times along the route.

Hence, route alternatives can be computed by executing one routing policy, assuming different travel times on certain sections of the route. For example, a route can be extracted from the routing policy as described in the section 'Determining a Route from a Routing Policy', and assume different travel times on the first, e.g. 20% of the route. The assumed travel times could be extracted from the corresponding travel time distribution, e.g. by ignoring the fastest and slowest 5% of the distribution, and picking equidistant samples from the remaining distribution.

Now each assumed travel time on this first part of the route may result in a different routing decision at or shortly after this part, defining alternative routes. When more alternatives are desired, the process can be iterated with the resulting alternatives, now assuming different travel times for the first, e.g. 20% of the divergent part of each alternative.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of generating a routing policy from an origin to a destination through a navigable network, the navigable network being represented by an electronic map comprising a plurality of segments representing navigable segments of the navigable network, each segment having associated therewith data indicative of an expected travel time along the segment, the method comprising:
    using the expected travel times for respective segments of the electronic map to determine a route from the origin to the destination that has a shortest expected journey time using a deterministic routing algorithm; and
    using a stochastic routing algorithm to generate a routing policy that maximises the probability of arriving at the destination within a time budget from leaving the origin, wherein the time budget is based at least on said determined shortest expected journey time.

2. The method of claim 1, wherein the routing policy is a solution to a set of non-linear equations that determine the next segment to take at a node of the electronic map based on the travel time taken to reach the node from the origin, such that the probably of arriving at the destination within the time budget is maximised.

3. The method of claim 1, wherein the time budget is further based on one or more of: an input from the user; time of day; day of the week; distance between the origin and the destination; and conditions on the navigable network, such as traffic and weather.

4. The method of claim 1, wherein the time budget equals, or is based on, the shortest expected journey time multiplied by a scaling factor.

5. The method of claim 4, wherein the scaling factor is based on one or more of: an input from the user; time of day; day of the week; distance between the origin and the destination; and conditions on the navigable network, such as traffic and weather.

6. The method of claim 1, wherein each segment in the electronic map is connected to another segment by a node, the method further comprising:
    generating a route from the origin to the destination by applying the generated routing policy to a scenario in which each segment is transited in a time based on the data indicative of the expected travel time for the respective segment, such that the arrival time at a node is the sum of the expected travel times of the segments forming the route from the origin to the node.

7. A non-transitory computer readable medium comprising instructions which, when executed by at least one processor of a computing device, cause the computing device to operate according to the method of claim 1 perform a method for generating a routing policy from an origin to a destination through a navigable network, the navigable network being represented by an electronic map comprising a plurality of segments representing navigable segments of the navigable network, each segment having associated therewith data indicative of an expected travel time along the segment, the method comprising:
    using the expected travel times for respective segments of the electronic map to determine a route from the origin to the destination that has a shortest expected journey time using a deterministic routing algorithm; and
    using a stochastic routing algorithm to generate a routing policy that maximises the probability of arriving at the destination within a time budget from leaving the origin, wherein the time budget is based at least on said determined shortest expected journey time.

8. A method of generating a route between an origin and a destination through a navigable network, the navigable network being represented by an electronic map comprising a plurality of segments representing navigable segments of the navigable network, each segment being connected to another segment by a node, and each segment having associated therewith data indicative of an expected travel time along the segment, the method comprising:
    accessing a routing policy that maximises the probability of arriving at the destination within a predetermined time budget; and
    generating a route from the origin to the destination by applying the routing policy to a scenario in which each segment is transited in a time based on the data indicative of the expected travel time for the respective segment, such that the arrival time at a node is the sum of the expected travel times of the segments forming the route from the origin to the node.

9. The method of claim 8, wherein the route is generated by applying the routing policy to a scenario in which each segment is transited in the expected travel time for the respective segment.

10. The method of claim 8, comprising displaying the generated route to a user on a display device.

11. The method of claim 8, comprising generating a plurality of routes from the origin to the destination, each route being generated by applying the generated routing policy to a different scenario, and wherein the time for transiting for at least some the segments differ between scenarios.

12. The method of claim 11, comprising generating a first route by applying the routing policy to a scenario in which each segment is transited in the expected travel time for the respective segment, and generating a second route by applying the routing policy to a scenario in which none or only some of the segments are transited in the expected travel time for the respective segment.

13. The method of claim 11, comprising displaying, the plurality of generated routes to a user on a display device.

14. The method of claim 13, comprising receiving a selection of one of the plurality of routing policies from the user based on the displayed plurality of generated routes.

15. The method of claim 8, comprising accessing a plurality of routing policies, each routing policy maximising the probability of arriving at the destination within a different predetermined time budget, and generating a plurality of routes from the origin to the destination by applying each of the plurality of routing policies to a scenario in which each segment is transited in a time based on the data indicative of the expected travel time for the respective segment, such that the arrival time at a node is the sum of the expected travel times of the segments forming the route from the origin to the node.

16. The method of claim 1, comprising outputting navigation instructions to guide the user from the origin to the destination based on a generated routing policy.

17. The method of claim 1, wherein the data indicative of an expected travel time along a segment associated with each segment is derived from position data collected from one or more users that have traversed the respective segment.

18. A system for generating a routing policy from an origin to a destination through a navigable network, the navigable network being represented by an electronic map comprising a plurality of segments representing navigable segments of the navigable network, each segment having associated therewith data indicative of an expected travel time along the segment, the system comprising one or more processors arranged to:

use the expected travel times for respective segments of the electronic map to determine a route from the origin to the destination that has a shortest expected journey time using a deterministic routing algorithm; and use a stochastic routing algorithm to generate a routing policy that maximises the probability of arriving at the destination within a time budget from leaving the origin, wherein the time budget is based at least on said determined shortest expected journey time.

19. The system of claim 18, wherein the system comprises a portable navigation device or navigation device integrated in a vehicle.

20. A system for generating a route between an origin and a destination through a navigable network, the navigable network being represented by an electronic map comprising a plurality of segments representing navigable segments of the navigable network, each segment being connected to another segment by a node, and each segment having associated therewith data indicative of an expected travel time along the segment, the system comprising one or more processors arranged to:

access a routing policy that maximises the probability of arriving at the destination within a predetermined time budget; and generate a route from the origin to the destination by applying the routing policy to a scenario in which each segment is transited in a time based on the data indicative of the expected travel time associated with the respective segment, such that the arrival time at a node is the sum of the times to travel the segments forming the route from the origin to the node.

\* \* \* \* \*